US008236896B2

(12) United States Patent
Hatae et al.

(10) Patent No.: US 8,236,896 B2
(45) Date of Patent: Aug. 7, 2012

(54) POWDERY PROCESSING AID FOR POLYOLEFIN RESINS, METHOD FOR PRODUCING THE SAME, RESIN COMPOSITION AND SHAPED ARTICLE

(75) Inventors: Youko Hatae, Otake (JP); Masaaki Kiura, Otake (JP); Hideo Aoki, Sagamihara (JP); Osamu Okunaka, Toyohashi (JP); Toshihiro Kasai, Otake (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 12/741,222

(22) PCT Filed: Nov. 7, 2008

(86) PCT No.: PCT/JP2008/070292
§ 371 (c)(1),
(2), (4) Date: May 4, 2010

(87) PCT Pub. No.: WO2009/060936
PCT Pub. Date: May 14, 2009

(65) Prior Publication Data
US 2010/0234530 A1    Sep. 16, 2010

(30) Foreign Application Priority Data

Nov. 7, 2007  (JP) ................................ 2007-289140

(51) Int. Cl.
C08F 8/00 (2006.01)
C08L 23/04 (2006.01)
C08L 33/04 (2006.01)
C08L 33/06 (2006.01)
C08L 35/02 (2006.01)

(52) U.S. Cl. ......... 525/191; 525/222; 525/227; 525/240

(58) Field of Classification Search .................. 525/191, 525/222, 227, 240
See application file for complete search history.

(56) References Cited

U.S. PATENT DOCUMENTS

| 4,877,853 | A | * | 10/1989 | Siol et al. .................. 526/329.7 |
| 5,055,529 | A | | 10/1991 | Kishida et al. |
| 5,506,307 | A | | 4/1996 | Memon |
| 6,337,374 | B1 | | 1/2002 | Ngoc et al. |
| 6,555,245 | B2 | * | 4/2003 | Tajima et al. ................. 428/520 |
| 6,875,802 | B2 | * | 4/2005 | Cruz et al. ..................... 524/54 |
| 2004/0143068 | A1 | * | 7/2004 | Honda et al. .................. 525/199 |

FOREIGN PATENT DOCUMENTS

| CN | 1507470 A | 6/2004 |
| DE | 100 59 488 A1 | 6/2001 |
| EP | 0 230 703 A1 | 8/1987 |
| EP | 0 335 365 A2 | 10/1989 |
| EP | 0 335 365 A3 | 10/1989 |
| EP | 1 398 352 A1 | 3/2004 |
| JP | 1 247409 | 10/1989 |
| JP | 4 100841 | 4/1992 |
| JP | 6 57151 | 3/1994 |
| JP | 8 302098 | 11/1996 |
| JP | 9 255816 | 9/1997 |
| JP | 11 124478 | 5/1999 |
| JP | 2000 159923 | 6/2000 |
| JP | 2002 249668 | 9/2002 |
| JP | 2003 113322 | 4/2003 |
| JP | 2003 292544 | 10/2003 |

OTHER PUBLICATIONS

Office Action issued Sep. 26, 2011, in Chinese Patent Application No. 200880114638.0, filed Nov. 7, 2008 (with English translation).

* cited by examiner

*Primary Examiner* — Nathan M Nutter
(74) *Attorney, Agent, or Firm* — Oblon, Spivak, McClelland, Maier & Neustadt, L.L.P.

(57) ABSTRACT

Disclosed are a powdery processing aid for polyolefin resins, containing an alkyl methacrylate polymer which has alkyl methacrylate units having an alkyl group with 2 to 6 carbon atoms as a main component and has a mass average molecular weight of 150,000 to 20,000,000, having good handling properties as a powder, having good dispersibility in polyolefin resins, and being able to improve shaping processability of polyolefin resins; and a polyolefin resin composition having improved shaping processability, which contains a powdery processing aid for polyolefin resins and a polyolefin resin.

18 Claims, No Drawings

POWDERY PROCESSING AID FOR POLYOLEFIN RESINS, METHOD FOR PRODUCING THE SAME, RESIN COMPOSITION AND SHAPED ARTICLE

TECHNICAL FIELD

The present invention relates to a powdery processing aid for polyolefin resins which improves shaping processability of the polyolefin resins, a method for producing the powdery processing aid for polyolefin resins, a resin composition, and a shaped article.

The present application claims the priority of Japanese Patent Application No. 2007-289,140 filed on Nov. 7, 2007, the contents of which are incorporated herein by reference.

BACKGROUND ART

Polyolefin resins are widely used as various shaped articles owing to their low cost and excellent physical properties. However, in the case of polypropylene, for example, there has been a problem such that various kinds of shaping defects have been generated in vacuum forming, blow molding, foam molding, extrusion molding, or calendering because melt tension of polypropylene at the time of shaping is low.

An attempt for raising melt tension of polypropylene by increasing a molecular weight of polypropylene has been carried out so as to improve such shaping processability as mentioned above, but there has been a problem such that a preferable balance between melt tension and melt fluidity cannot be obtained attributed to lowering of melt fluidity, as one of the indices of shaping processability, caused by the molecular weight increase.

As a method for improving shaping processability of polyolefin resins, there have been proposed methods of adding an alkyl(meth)acrylate polymer having a long chain alkyl group to the polyolefin resins (Patent Documents 1 and 2). In Patent Document 1, lauryl methacrylate polymer is used as the alkyl (meth)acrylate polymer, and in Patent Document 2, stearyl methacrylate copolymer is used as the alkyl(meth)acrylate polymer.

However, there is a case where handling properties, as an additive, of the alkyl (meth)acrylate polymer having a long chain alkyl group become a problem because it is difficult to recover the alkyl(meth)acrylate polymer as a powder owing to its low glass transition temperature. Moreover, there is a case where a homogeneous resin composition cannot be obtained because it is difficult to homogeneously disperse the alkyl(meth)acrylate polymer in polyolefin resins.

In addition, a method of adding a processing aid containing polytetrafluoroethylene to the polyolefin resins has been proposed (Patent Document 3). However, there has been a need for dehalogenation depending on a use of the polyolefin resins, and hence a halogen-free processing aid for the polyolefin resins has been strongly desired.

Patent Document 1: Japanese Patent Application Laid-Open No. Hei 9-255,816
Patent Document 2: Japanese Patent Application Laid-Open No. Hei 8-302,098
Patent Document 3: Japanese Patent Application Laid-Open No. Hei 11-124,478

DISCLOSURE OF INVENTION

Problem to be Solved by the Invention

It is an object of the present invention to provide a processing aid for polyolefin resins having good handling properties as a powder, having good dispersibility in polyolefin resins, and being able to improve shaping processability of polyolefin resins.

Means for Solving the Problem

The present inventors have diligently researched to solve the above-mentioned subject and found that it is possible to improve shaping processability, without deteriorating surface appearance of a shaped article to be obtained, by adding an alkyl methacrylate polymer which has alkyl methacrylate units having an alkyl group with 2 to 6 carbon atoms as a main component and has a mass average molecular weight of 150,000 to 20,000,000 to a polyolefin resin.

Namely, powdery processing aid A for polyolefin resins of the present invention comprises an alkyl methacrylate polymer which has alkyl methacrylate units having an alkyl group with 2 to 6 carbon atoms as a main component and has a mass average molecular weight of 150,000 to 20,000,000.

The polyolefin resin composition of the present invention comprises powdery processing aid A for polyolefin resins and polyolefin resin B, or comprises powdery processing aid A for polyolefin resins, polyolefin resin B, and thermoplastic elastomer C.

The shaped article of the present invention is obtained by shaping the polyolefin resin composition.

The method for producing powdery processing aid A for polyolefin resins of the present invention comprises the step of recovering an alkyl methacrylate polymer from a latex of the alkyl methacrylate polymer which has alkyl methacrylate units having an alkyl group with 2 to 6 carbon atoms as a main component, has a mass average molecular weight of 150,000 to 20,000,000, and has a mass average particle diameter of 50 to 250 nm.

Effect of the Invention

Powdery processing aid A for polyolefin resins of the present invention has good handling properties as a powder, has good dispersibility in polyolefin resins, and is able to improve shaping processability of polyolefin resins.

The polyolefin resin composition of the present invention has excellent shaping processability and does not deteriorate surface appearance of a shaped article to be obtained.

The shaped article of the present invention has excellent surface appearance.

According to the production method of the present invention, powdery processing aid A for polyolefin resins having good handling properties as a powder, having good dispersibility in polyolefin resins, and being able to improve shaping processability of polyolefin resins can be efficiently provided.

BEST MODE FOR CARRYING OUT THE INVENTION

Hereinafter, the present invention will be explained in more detail.

The alkyl methacrylate polymer of the present invention has alkyl methacrylate units having an alkyl group with 2 to 6 carbon atoms as a main component and has a mass average molecular weight of 150,000 to 20,000,000.

The alkyl methacrylate polymer that has alkyl methacrylate units having an alkyl group with 2 to 6 carbon atoms as a main component can be obtained by polymerization of a monomer constituent containing an alkyl methacrylate having an alkyl group with 2 to 6 carbon atoms as a main component by way of radical polymerization or ion polymerization. In particular, radical polymerization is preferable.

Examples of the alkyl methacrylate having an alkyl group with 2 to 6 carbon atoms include ethyl methacrylate, n-propyl methacrylate, isopropyl methacrylate, n-butyl methacrylate, isobutyl methacrylate, sec-butyl methacrylate, t-butyl methacrylate, 2-methylbutyl methacrylate, 3-methylbutyl methacrylate, 3-pentyl methacrylate, n-hexyl methacrylate, and cyclohexyl methacrylate. These monomers can be used alone or in a combination of two or more kinds thereof.

When the alkyl group in the alkyl methacrylate has 2 or more carbon atoms, dispersibility of the resulting powdery processing aid in polyolefin resins becomes good, and when the alkyl group in the alkyl methacrylate has 6 or less carbon atoms, handling properties of the resulting powdery processing aid as a powder become good.

It is preferable that the alkyl group in the alkyl methacrylate have 4 carbon atoms because dispersibility of the resulting powdery processing aid in polyolefin resins and handling properties of the resulting powdery processing aid as a powder become good, and it is more preferable that the alkyl methacrylate be n-butyl methacrylate or isobutyl methacrylate because the resulting powdery processing aid is excellent in improving shaping processability of polyolefin resins. In addition, it is furthermore preferable that the alkyl methacrylate be isobutyl methacrylate because the balance between dispersibility in polyolefin resins and handling properties as a powder become good.

The monomer constituent of the present invention may contain another monomer, if necessary.

Examples of the other monomer include an aromatic vinyl monomer such as styrene, α-methyl styrene, and chlorostyrene; an alkyl acrylate such as methyl acrylate, butyl acrylate, and dodecyl acrylate; methyl methacrylate; an alkyl methacrylate having an alkyl group with 7 or more carbon atoms such as dodecyl methacrylate; a vinyl cyanide monomer such as acrylonitrile and methacrylonitrile; a vinyl ether monomer such as vinyl methyl ether and vinyl ethyl ether; a vinyl carboxylate monomer such as vinyl acetate and vinyl butylate; an olefin monomer such as ethylene, propylene, and isobutylene; a dien monomer such as butadiene, isoprene, and dimethyl butadiene; and a monomer having a light-stabilizing group such as 4-(meth)acryloyloxy-2,2,6,6-tetramethylpiperidine and 4-(meth)acryloylamino-2,2,6,6-tetramethylpiperidine. The other monomers may be used alone or in a combination of two or more kinds thereof.

Note that, in the present invention, "(meth)acryloyl" means at least one kind selected from "acryloyl" and "methacryloyl".

The content of the alkyl methacrylate having an alkyl group with 2 to 6 carbon atoms is preferably 50% by mass or more in the monomer constituent (100% by mass), more preferably 70% by mass or more, and furthermore preferably 80% by mass or more.

When the content of the alkyl methacrylate having an alkyl group with 2 to 6 carbon atoms is 50% by mass or more in the monomer constituent (100% by mass), dispersibility of the resulting powdery processing aid in polyolefin resins becomes good.

As a polymerization method of the monomer constituent, conventional polymerization methods can be mentioned. Among them, emulsion polymerization is preferable because the alkyl methacrylate polymer can be obtained in a powdery form or granular form. Conventional methods can be applied for the emulsion polymerization.

Various conventional emulsifiers can be used for the emulsion polymerization. As the emulsifiers, anion emulsifiers such as sulfonate compounds, sulfate compounds, and phosphate compounds are preferable. The emulsifiers may be used alone or in a combination of two or more kinds.

Conventional initiators can be used for an initiator. Examples of the initiator include persulfates such as potassium persulfate and sodium persulfate; organic peroxides such as t-butyl hydroperoxide, cumene hydroperoxide, and benzoyl peroxide; azo compounds such as azobis(isobutylonitrile); and redox initiators each of which combines the above persulfate or organic peroxide with a reducing agent. The polymerization temperature varies depending on the kind of initiator, but it is generally 40 to 80° C.

As a method for making powder from the latex of the alkyl methacrylate polymer to be obtained by emulsion polymerization, coagulation and spray drying can be mentioned.

The mass average molecular weight of the alkyl methacrylate polymer is 150,000 to 20,000,000. When the mass average molecular weight of the alkyl methacrylate polymer is 150,000 or more, the resulting powdery processing aid is excellent in improving shaping processability of the resulting polyolefin resins, and when it is 20,000,000 or less, dispersibility of the resulting powdery processing aid in polyolefin resins becomes good.

The mass average molecular weight of the alkyl methacrylate polymer is preferably 500,000 or more, more preferably 1,000,000 or more, and furthermore preferably 1,600,000 or more. And it is preferably 15,000,000 or less and more preferably 7,000,000 or less.

The mass average particle diameter of the alkyl methacrylate polymer in the latex is 50 to 250 nm. When the mass average particle diameter of the alkyl methacrylate polymer in the latex is 50 nm or more, unfavorable influences to be exerted by the emulsifier used in the emulsion polymerization on polyolefin resins can be minimized, and when it is 250 nm or less, termination reaction during the polymerization for the alkyl methacrylate polymer is hard to occur and hence, for example, molecular weight control at a high molecular weight such as mass average molecular weight of 1,600,000 or more becomes easy.

Powdery processing aid A for polyolefin resins of the present invention contains the alkyl methacrylate polymer of the present invention.

Powdery processing aid A for polyolefin resins may contain various additives such as lubricant, stabilizer, and flame retardant besides the alkyl methacrylate polymer in such an amount that the characteristics of the powdery processing aid for polyolefin resins are not impaired.

Polyolefin resin B to be used in the present invention has, as a main component, a homopolymer or copolymer of an olefin monomer, a copolymer of a major proportion of an olefin monomer and a minor proportion of a vinyl monomer, or a copolymer of an olefin monomer and a dien monomer.

Examples of the olefin monomer include ethylene, propylene, 1-butene, 1-hexene, 1-decene, and 1-octene. Among them, ethylene and propylene are preferable.

Examples of polyolefin resin B include low density polyethylene, very low density polyethylene, ultra low density polyethylene, linear low density polyethylene, high density polyethylene, ultra high molecular weight polyethylene, polypropylene, ethylene-propylene copolymer, polybutene, and ethylene-vinyl acetate copolymer. These polyolefin resins may be used alone or in a combination of two or more kinds thereof.

Among them, one having one or more kinds selected from polyethylene, polypropylene, ethylene-propylene copolymer, and ethylene-vinyl acetate copolymer as a main component is preferable.

Examples of polyethylene include "Novatec-HD HJ360", "Novatec-HD HJ362N", "Novatec-HD HJ560", "Novatec-HD HJ580", "Novatec-HD HJ490", "Novatec-HD HJ590N", "Novatec-HD HY420", "Novatec-HD HY530", "Novatec-HD HY430", "Novatec-HD HY331", "Novatec-HD HY540", "Novatec-HD HE421", "Novatec-HD HE321E", "Novatec-HD HF313", "Novatec-HD HF111", "Novatec-HD HF133", and "Novatec-HD HF560" (all of them are trade names, manufactured by Japan Polyethylene Corporation), "HI-ZEX" (trade name, manufacture by Prime Polymer Co., Ltd.), "Mineron", "Mineace", "Minefan" (all of them are trade names, manufacture by Sankyo Polyethylene Co., Ltd.), and "Evaflex", "ElvaloyAC", "Nucrel" (all of them are trade names, manufactured by Dupont-Mitsui Polychemicals Co., Ltd.).

Examples of polypropylene include "Novatec-PP FY4", "Novatec-PP EA9", "Novatec-PP MA3", "Novatec-PP MA3H", "Novatec-PP MA1B", "Novatec-PP BC03C", "Novatec-PP BC03B", "Novatec-PP BC05B", "Novatec-PP BC06C", "Wintec", "Newcon", "Newstren", "Newfoamer", "Funcster" (all of them are trade names, manufactured by Japan Polypropylene Corporation), "Prime Polypro J105G", "Prime Polypro J106G", "Prime Polypro J106MG", "Prime Polypro J108M", "Prime Polypro BJS-MU", "Prime Polypro J704LB", "Prime Polypro J704MG", "Prime Polypro J705MG", "Prime Polypro J715M", "Prime Polypro J717ZG", "Prime Polypro 111G", "Prime Polypro B221WA", "Prime Polypro J232WA", "Prime Polypro B241", "Prime Polypro F113G", "Prime Polypro F109V", "Prime Polypro F227D", "Prime Polypro F219DA", and "Prime Polypro F329RA" (all of them are trade names, manufactured by Prime Polymer Co., Ltd.).

Examples of thermoplastic elastomer C to be used in the present invention include various thermoplastic elastomers such as olefin elastomer, styrene elastomer, polyester elastomer, polyamide elastomer, and polyurethane elastomer; natural or synthesized rubbers such as natural rubber, polyisobutylene, polyisoprene, chloroprene rubber, butyl rubber, and nitrile butyl rubber. Among them, the olefin elastomer and the styrene elastomer are preferable. These thermoplastic elastomers may be used alone or in a combination of two or more kinds thereof.

Examples of the olefin elastomer include ethylene-propylene copolymer (EPR), ethylene-propylene-dien copolymer (EPDM), ethylene-1-butene copolymer, a noncrystalline ethylene such as ethylene-1-octene copolymer, a microcrystalline ethylene-α-olefin copolymer, wherein α-olefin is, for example, polybutene, polyethylene chloride, polypropylene and EPDM, and, if necessary, a polymer in which polyethylene portion in any one of the above polymer is partially or perfectly crosslinked.

Further, examples of EPR include "JSR EP11", "JSR EP21", "JSR EP22", "JSR EP24", "JSR EP25", "JSR EP103AF", "JSR EP107", "JSR EP33", "JSR EP35", "JSR EP37F", and "JSR EP65" (all of them are trade names, manufactured by JSR Corporation).

Examples of the styrene elastomer include a block copolymer such as styrene-butadien-styrene copolymer (SBS), styrene-isoprene-styrene copolymer (SIS), and styrene-isoprene/butadien-styrene copolymer (SIBS); and a partially or perfectly hydrogenated block copolymer such as styrene-ethylene/butene-styrene copolymer (SEBS), hydrogenated SEBS, styrene-ethylene/propylene-styrene copolymer (SEPS), and styrene-butadien/butylene-styrene copolymer (partially hydrogenated styrene-butadien-styrene copolymer).

Further, examples of the hydrogenated SEBS include "Tuftec H1031", "Tuftec H1041", "Tuftec H1043", "Tuftec H1051", "Tuftec H1052", "Tuftec H1053", "Tuftec H1062", "Tuftec H1141", "Tuftec H1221", and "Tuftec H1272" (all trade names, manufactured by Asahi Kasei Chemicals Corporation), "Dynaron 8601 P" and "Dynaron 9901P" (all of them are trade names, manufactured by JSR Corporation).

In addition, Examples of a mixture of polyolefin resin B and thermoplastic elastomer C include "Milastomer 5030N", "Milastomer 6030N", "Milastomer 7030N", "Milastomer 8032N", "Milastomer 8030N", "Milastomer 9020N", "Milastomer 9070N", "Milastomer M2400B", and "Milastomer 2600B" (all trade names, manufacture by Mitsui Chemicals, Inc.), "Thermorun 5800B", "Thermorun 5850N", "Thermorun 3655B", and "Thermorun 3855B" (all trade names, manufacture by Mitsubishi Chemical Corporation), "Espolex 3785", "Espolex 3885", "Espolex 901", "Espolex 907", "Espolex 4785", "Espolex 820", "Espolex 822", and "Espolex 817" (all trade names, manufacture by Sumitomo Chemical Co., Ltd.), "Santoprene 101-55", "Santoprene 103-40", "Santoprene 121-68W228", and "Santoprene 121-50M100" (all of them are trade names, manufactured by ExxonMobil Y.K.).

The polyolefin resin composition of the present invention contains powdery processing aid A for polyolefin resins, polyolefin resin B, and, if necessary, thermoplastic elastomer C.

Although the proportion of polyolefin resin B and thermoplastic elastomer C in the polyolefin resin composition varies depending on the kind of thermoplastic elastomer C or the use of the obtained shaped article, it is generally preferable that B be 25 to 100% by mass and C be 0 to 75% by mass provided that the sum of B and C be 100% by mass.

When the polyolefin resin composition does not contain thermoplastic elastomer C, it contains preferably 0.5 to 20 parts by mass and more preferably 1 to 15 parts by mass of powdery processing aid A for polyolefin resins relative to 100 parts by mass of polyolefin resin B.

When the polyolefin resin composition contains thermoplastic elastomer C, it contains preferably 0.5 to 20 parts by mass and more preferably 1 to 15 parts by mass of powdery processing aid A for polyolefin resins relative to 100 parts by mass of the sum of polyolefin resin B and thermoplastic elastomer C.

When the blending amount of powdery processing aid A for polyolefin resins relative to 100 parts by mass of polyolefin resin B (relative to 100 parts by mass of the sum of polyolefin resin B and thermoplastic elastomer C, when thermoplastic elastomer C is contained) is 0.5 part by mass or more, shaping processability of the resulting polyolefin resins can be sufficiently improved, and when the blending amount is 20 parts by mass or less, characteristics of the resulting polyolefin resins cannot be deteriorated.

With respect to the polyolefin resin composition of the present invention, melt tension during shaping is improved and hence drawing properties during calendering, resistance to drawdown of the molten resin during thermoforming or blow molding, resistance to consolidation of foam-cells during foam molding, and the like are improved, so that shaping processability in calendering, thermoforming, blow molding, or foam molding are improved. In addition, discharge rate during extrusion molding and surface appearance of extruded molded articles such as sheets and films are improved and hence shaping processability during extrusion molding are also improved.

Various additives such as filler, stabilizer, lubricant, flame retardant, foaming agent, antioxidant, and plasticizer can be added to the polyolefin resin composition of the present invention, if necessary, in such an amount that the characteristics of the polyolefin resin composition are not impaired.

Examples of the filler include calcium carbonate, magnesium carbonate, calcium sulfate, barium sulfate, magnesium hydroxide, aluminum hydroxide, talc, mica, kaolin, titanium white, white carbon, carbon black, and glass fiber. Among these fillers, calcium carbonate and talc are preferable. By incorporation of fillers, stiffness or heat resistance of the resulting polyolefin resin composition can be improved, and thus improvement in shaping processability such as prevention of adhesion to surfaces of rolls during calendering can be attained, and also cost reduction can be attained.

The blending amount of the filler is preferably 0.1 to 400 parts by mass relative to 100 parts by mass of polyolefin resin B (relative to 100 parts by mass of the sum of polyolefin resin B and thermoplastic elastomer C, when thermoplastic elastomer C is contained). When the blending amount of the filler is 0.1 part by mass or more, stiffness of the resulting polyolefin resin composition can be sufficiently improved, and when it is 400 parts by mass or less, surface appearance of the resulting shaped article cannot be deteriorated.

Examples of the stabilizer include phenol stabilizers such as pentaerythrityl-tetrakis[3-(3,5-di-t-butyl-4-hydroxyphenyl)propionate] and triethylenegrycol-bis[3-(3-t-butyl-5-metyl-4-hydroxyphenyl)propionate]; phosphorus stabilizers such as tris(mononylphenyl)phosphite and tris(2,4-di-t-butylphenyl)phosphite; and sulfur stabilizers such as dilauryl thiodipropionate.

Examples of the lubricant include sodium salt, calcium salt, or magnesium salt of lauric acid, palmitic acid, or oleic acid.

Examples of the flame retardant include phosphate compounds such as trimethyl phosphate, triethyl phosphate, tributyl phosphate, trioctyl phosphate, tributoxyethyl phosphate, triphenyl phosphate, tricresyl phosphate, cresylphenyl phosphate, octyldiphenyl phosphate, diisopropylphenyl phosphate, tris(chloroethyl)phosphate, alkoxy-substituted bisphenol A bisphosphate, hydroquinone bisphosphate, resorcine bisphosphate, and trioxybenzene triphosphate; halogen-containing compounds such as tetrabromobisphenol A, decabromodiphenyl oxide, hexabromocyclododecane, octabromodiphenyl ether, bistribromophenoxy ethane, ethylene bis tetrabromo phthalimide, tribromophenol, halogenated epoxy oligomer, halogenated carbonate oligomer, halogenated polystyrene, and chlorinated polyolefin; metal hydroxides; metal oxides; and sulfamic acid based compounds.

The blending amount of the flame retardant is preferably 50 to 200 parts by mass relative to 100 parts by mass of polyolefin resin B (relative to 100 parts by mass of the sum of polyolefin resin B and thermoplastic elastomer C, when thermoplastic elastomer C is contained).

Examples of the foaming agent include inorganic foaming agents such as carbon dioxide, air, and nitrogen; volatile foaming agents such as aliphatic hydrocarbons like propane, n-butane and isobutane, and halogenated hydrocarbons like trichlorofluoromethane, methyl chloride, ethyl chloride, and methylene chloride; and decomposable foaming agents such as azodicarbonamide, dinitrosopentamethylenetetramine, azobis(isobutylonitrile), and sodium bicarbonate. These foaming agents may be used alone or in a combination of two or more kinds thereof.

The blending amount of the foaming agent is preferably 0.1 to 25 parts by mass relative to 100 parts by mass of polyolefin resin B (relative to 100 parts by mass of the sum of polyolefin resin B and thermoplastic elastomer C, when thermoplastic elastomer C is contained).

The polyolefin resin composition of the present invention can be prepared by blending powdery processing aid A for polyolefin resins, polyolefin resin B, and, if necessary, thermoplastic elastomer C and various additives, and then melt-kneading them by means of a conventional method such as extrusion kneading or roll-kneading.

In addition, a multi step blending is also possible, in which a master batch is prepared at first by mixing powdery processing aid A for polyolefin resins and a part of polyolefin resin B and, if necessary, thermoplastic elastomer C, or at first by mixing powdery processing aid A for polyolefin resins and a part of thermoplastic elastomer C, and then the remaining polyolefin resin B and/or thermoplastic elastomer C are blended therein.

The shaped article of the present invention can be obtained by shaping the polyolefin resin composition of the present invention. Examples of the shaping method include calendering, thermoforming, extrusion blow molding, foam molding, extrusion molding, injection molding, and melt spinning.

Examples of the shaped article of the present invention include sheets, films, and profile extrusion products obtained by extrusion molding; and hollow shaped articles, injection-molded articles, and shaped foam articles obtained by extrusion blow molding or injection molding.

EXAMPLES

Hereinafter, the present invention will be explained in more detail by examples, but the present invention is not limited to these examples. In the examples, "part" and "%" represent "part by mass" and "% by mass", respectively. In addition, measurements of various physical properties in each of the examples and comparative examples are carried out in accordance with the following methods (1) to (6).

(1) Mass Average Molecular Weight

A mass average molecular weight of the alkyl methacrylate polymer was measured by means of a gel permeation chromatograph (HLC-8220, manufactured by Tosoh Corporation) and a column (TSK-GEL SUPER HZM-M, manufactured by Tosoh Corporation) using dissolved portion of the alkyl methacrylate polymer in tetrahydrofuran as a sample.

The mass average molecular weight was obtained from a calibration curve based on standard polystyrenes.

(2) Mass Average Particle Diameter

A mass average particle diameter of the latex of the alkyl methacrylate polymer was measured by means of a particle size measuring instrument (CHDF2000, manufactured by Matec Instrument Companies, Inc.) using the latex of the alkyl methacrylate polymer diluted with deionized water as a sample.

The standard conditions recommended by Matec Instrument Companies, Inc. were adopted as the measurement conditions. Namely, using a specific capillary cartridge for particle separation and a carrier liquid under the conditions of a liquid pH of neutral, a flow rate of 1.4 ml/min, a pressure of about 4,000 psi (2,600 KPa), and a temperature of 35° C., about 0.1 ml of a sample in which the latex is diluted to a concentration of 3% was measured.

Twelve kinds of monodispersed polystyrene each having a predetermined particle diameter in the range of from 20 to 800 nm were taken as standard substances for the particle diameter measurement.

(3) Handling Properties as a Powder

The powdery processing aid was passed through an 8 mesh sieve. By this experiment, handling properties as a powder were evaluated according to the following criteria.

a: The amount passed through the sieve is 90% or more.
b: The amount passed through the sieve is 10% or more and less than 90%.
c: The amount passed through the sieve is less than 10%.

(4) Melt Tension

As an index for shaping processability, melt tension was evaluated. The melt tension is an index for properties of thermoforming, blow molding, or foam molding, and improvement of melt tension can be regarded as improvement of shaping processability.

Melt tension was measured as follows.

The polyolefin resin composition was extruded at a constant rate (0.54 cm$^3$/min) using a capillary rheometer (Twin capillary rheometer RH-7, manufactured by Rosand) and a strand was drawn out at a constant rate (3 m/min). The L/D of the die was 16.0 mm/φ 1.0 mm, and the temperature was 190° C.

(5) Melt Viscosity

Melt viscosity of the polyolefin resin composition was measured using a capillary rheometer (Twin capillary rheometer RH-7, manufactured by Rosand) at a shear rate of 268/second. The L/D of the die was 16.0 mm/φ 1.0 mm, and the temperature was 190° C.

(6) Appearance

As an index for a surface appearance of the shaped article, an appearance of a strand was evaluated. The appearance of a strand was evaluated as follows.

The polyolefin resin composition was extruded using a capillary rheometer (Twin capillary rheometer RH-7, manufactured by Rosand) at a shear rate of 1,000/second, a L/D of the dies of 16.0 mm/φ 1.0 mm, and a temperature of 190° C., to obtain a strand. Visual inspection of the appearance of the strand thus obtained was carried out and the appearance was evaluated according to the following criteria.

a: No roughness on the surface is observed.
b: Partial roughness on the surface is observed.
c: Roughness on the surface is observed.

Production Example 1

Production of Alkyl Methacrylate Polymer (1)

The following monomer mixture was stirred at 10,000 rpm for 6 minutes with a homo mixer to obtain an emulsion mixture.

Monomer Mixture:

| Isobutyl methacrylate | 100 parts |
| Sodium dodecylbenzene sulfonate | 1 part |
| Deionized water | 300 parts |

The above emulsion mixture was charged into a separable flask equipped with a thermometer, nitrogen introduction pipe, cooling pipe, and stirrer, and the inside of the flask was replaced by nitrogen. Then, the inside temperature was raised to 60° C. and 0.15 part of potassium persulfate was added thereto. Subsequently, the heating and stirring were continued for 2 hours for completion of polymerization to obtain a latex of alkyl methacrylate polymer (1).

Coagulation of a latex was carried out by dropping the latex of alkyl methacrylate polymer (1) thus obtained into 100 parts of hot water containing 5 parts of calcium acetate. The coagulated material was separated and washed, and dried at 65° C. for 16 hours to obtain alkyl methacrylate polymer (1). The mass average molecular weight and the mass average particle diameter of alkyl methacrylate polymer (1) thus obtained are shown in Table 1.

Production Examples 2 to 13

Production of Alkyl Methacrylate Polymers (2) to (13)

The same procedure as in production example 1 was carried out except that the monomer constituent, the amount of initiator, and the amount of chain transfer agent were changed as shown in Table 1 to obtain each of alkyl methacrylate polymers (2) to (13). Potassium persulfate and n-octyl mercaptan were used as the initiator and the chain transfer agent, respectively.

Production Example 14

Production of Alkyl Methacrylate Polymer (14)

The following monomer mixture was stirred at 10,000 rpm for 6 minutes with a homo mixer and then compulsorily emulsified with a homogenizer at a pressure of 200 kg/cm to obtain an emulsion mixture.

Monomer Mixture:

| 2-ethylhexyl methacrylate | 100 parts |
| Sodium dodecylbenzene sulfonate | 1 part |
| Deionized water | 300 parts |

The above emulsion mixture was charged into a separable flask equipped with a thermometer, nitrogen introduction pipe, cooling pipe, and stirrer, and the inside of the flask was replaced by nitrogen. Then, the inside temperature was raised to 60° C. and the following aqueous solution of reducing agent was introduced therein.

Aqueous Solution of Reducing Agent:

| Ferrous sulfate | 0.0003 part |
| Disodium ethylenediaminetetraacetate | 0.0009 part |
| Rongalit | 0.1 part |
| Deionized water | 5 parts |

Then, 0.15 part of t-butyl hydroperoxide was added therein. Subsequently, the heating and stirring were continued for 2 hours for completion of polymerization to obtain a latex of alkyl methacrylate polymer (14).

Coagulation of a latex was carried out by dropping the latex of alkyl methacrylate polymer (14) thus obtained into 100 parts of cold water containing 5 parts of calcium acetate. The coagulated material was separated and washed, and dried at 65° C. for 16 hours to obtain alkyl methacrylate polymer (14). The mass average molecular weight and the mass average particle diameter of alkyl methacrylate polymer (14) thus obtained are shown in Table 1.

Examples 1 to 10 and Comparative Examples 1 to 4

Thus obtained alkyl methacrylate polymers (1) to (14) were taken as powdery processing aids (A1) to (A14) for polyolefin resins, respectively. Handling properties as a powder of powdery processing aids (A1) to (A14) were evaluated. The results of evaluation are shown in Table 1.

TABLE 1

|  |  | Prod. Ex. 1 | Prod. Ex. 2 | Prod. Ex. 3 | Prod. Ex. 4 | Prod. Ex. 5 | Prod. Ex. 6 | Prod. Ex. 7 |
|---|---|---|---|---|---|---|---|---|
| Monomer constituent [part] | iBMA | 100 | 100 | 100 | 100 | 98 | 95 | 90 |
|  | nBMA | — | — | — | — | — | — | — |
|  | 2EHMA | — | — | — | — | — | — | — |
|  | MMA | — | — | — | — | — | — | — |
|  | nBA | — | — | — | — | 2 | 5 | 10 |
| Initiator [part] |  | 0.15 | 1 | 0.15 | 0.15 | 0.15 | 0.15 | 0.15 |
| Chain transfer agent [part] |  | — | — | 0.02 | 0.1 | — | — | — |
| Mass average molecular weight |  | 3 million | 2 million | 1 million | 0.17 million | 3 million | 2.3 million | 2.2 million |
| Mass average particle diameter [nm] |  | 147 | 123 | 120 | 147 | 132 | 119 | 118 |

|  | Ex. 1 | Ex. 2 | Ex. 3 | Ex. 4 | Ex. 5 | Ex. 6 | Ex. 7 |
|---|---|---|---|---|---|---|---|
| Powdery processing aid | A1 | A2 | A3 | A4 | A5 | A6 | A7 |
| Handling properties as a powder | a | a | a | a | a | a | a |

|  |  | Prod. Ex. 8 | Prod. Ex. 9 | Prod. Ex. 10 | Prod. Ex. 11 | Prod. Ex. 12 | Prod. Ex. 13 | Prod. Ex. 14 |
|---|---|---|---|---|---|---|---|---|
| Monomer constituent [part] | iBMA | — | — | — | 100 | — | — | — |
|  | nBMA | 100 | 100 | 75 | — | — | 25 | — |
|  | 2EHMA | — | — | — | — | — | — | 100 |
|  | MMA | — | — | 25 | — | 100 | 75 | — |
|  | nBA | — | — | — | — | — | — | — |
| Initiator [part] |  | 0.15 | 0.15 | 0.15 | 0.15 | 0.15 | 0.15 | 0.15 |
| Chain transfer agent [part] |  | — | 0.1 | — | 2 | — | — | — |
| Mass average molecular weight |  | 3 million | 0.2 million | 3 million | 0.01 million | 3 million | 3 million | 2 million |
| Mass average particle diameter [nm] |  | 139 | 145 | 110 | 147 | 114 | 108 | 131 |

|  | Ex. 8 | Ex. 9 | Ex. 10 | Comp. Ex. 1 | Comp. Ex. 2 | Comp. Ex. 3 | Comp. Ex. 4 |
|---|---|---|---|---|---|---|---|
| Powdery processing aid | A8 | A9 | A10 | A11 | A12 | A13 | A14 |
| Handling properties as a powder | a | a | a | a | a | a | c |

The abbreviations in the table are as follows.
iBMA: isobutyl methacrylate
nBMA: n-butyl methacrylate
2EHMA: 2-ethylhexyl methacrylate
MMA: methyl methacrylate
nBA: n-butyl acrylate Examples 11 to 20 and Comparative Examples 5 to 9

In these Examples and Comparative Examples, each of powdery processing aids (A1) to (A14) for polyolefin resins was blended with polypropylene (Novatec FY4, manufactured by Japan Polypropylene Corporation) used as polyolefin resin B, with a proportion shown in Table 2, respectively. Subsequently, the resulting mixture was melt-kneaded with a single screw extruder (manufactured by TPIC Co., Ltd.) at a barrel temperature of 190° C. and a number of screw revolutions of 50 rpm to obtain pellets of a polyolefin resin composition. The evaluation results of the pellets thus obtained are shown in Table 2.

Note that, in Comparative Example 7 where powdery processing aid (A12) containing methyl methacrylate polymer having a mass average molecular weight of 3,000,000 was used, compatibility of powdery processing aid (A12) with polypropylene was low and hence a strand could not be drawn out.

TABLE 2

|  |  |  | Ex. 11 | Ex. 12 | Ex. 13 | Ex. 14 | Ex. 15 | Ex. 16 | Ex. 17 | Ex. 18 |
|---|---|---|---|---|---|---|---|---|---|---|
| Blending composition [part] | PP |  | 100 | 100 | 100 | 100 | 100 | 100 | 100 | 100 |
|  | Powdery processing aid | A1 | 10 | — | — | — | — | — | — | — |
|  |  | A2 | — | 10 | — | — | — | — | — | — |
|  |  | A3 | — | — | 10 | — | — | — | — | — |
|  |  | A4 | — | — | — | 10 | — | — | — | — |
|  |  | A5 | — | — | — | — | 10 | — | — | — |

TABLE 2-continued

|  |  | | | | | | | | |
|---|---|---|---|---|---|---|---|---|---|
|  | A6 | — | — | — | — | — | 10 | — | — |
|  | A7 | — | — | — | — | — | — | 10 | — |
|  | A8 | — | — | — | — | — | — | — | 10 |
|  | A9 | — | — | — | — | — | — | — | — |
|  | A10 | — | — | — | — | — | — | — | — |
|  | A11 | — | — | — | — | — | — | — | — |
|  | A12 | — | — | — | — | — | — | — | — |
|  | A13 | — | — | — | — | — | — | — | — |
|  | A14 | — | — | — | — | — | — | — | — |
| Evaluation results | Melt tension [N] | 0.068 | 0.058 | 0.056 | 0.040 | 0.057 | 0.061 | 0.052 | 0.050 |
|  | Melt viscosity [Pa·s] | 320 | 323 | 318 | 234 | 301 | 301 | 287 | 301 |

|  |  |  | Ex. 19 | Ex. 20 | Comp. Ex. 5 | Comp. Ex. 6 | Comp. Ex. 7 | Comp. Ex. 8 | Comp. Ex. 9 |
|---|---|---|---|---|---|---|---|---|---|
| Blending composition [part] | PP |  | 100 | 100 | 100 | 100 | 100 | 100 | 100 |
|  | Powdery processing aid | A1 | — | — | — | — | — | — | — |
|  |  | A2 | — | — | — | — | — | — | — |
|  |  | A3 | — | — | — | — | — | — | — |
|  |  | A4 | — | — | — | — | — | — | — |
|  |  | A5 | — | — | — | — | — | — | — |
|  |  | A6 | — | — | — | — | — | — | — |
|  |  | A7 | — | — | — | — | — | — | — |
|  |  | A8 | — | — | — | — | — | — | — |
|  |  | A9 | 10 | — | — | — | — | — | — |
|  |  | A10 | — | 10 | — | — | — | — | — |
|  |  | A11 | — | — | — | 10 | — | — | — |
|  |  | A12 | — | — | — | — | 10 | — | — |
|  |  | A13 | — | — | — | — | — | 10 | — |
|  |  | A14 | — | — | — | — | — | — | 10 |
| Evaluation results | Melt tension [N] |  | 0.042 | 0.041 | 0.019 | 0.027 | Not measurable | 0.030 | 0.047 |
|  | Melt viscosity [Pa·s] |  | 220 | 297 | 246 | 160 | Not measurable | 270 | 236 |

The abbreviation in the table is as follows.
PP: polypropylene

Examples 21 to 24 and Comparative Examples 10 to 13

In these Examples and Comparative Examples, each of the powdery processing aids for polyolefin resins was blended with polyethylene (HI-ZEX 5305E, manufactured by Prime Polymer Co., Ltd.) used as polyolefin resin B, with a proportion shown in Table 3, respectively, and the resulting mixture was melt-kneaded in the same manner as in Example 11 to obtain pellets. The evaluation results of the pellets thus obtained are shown in Table 3.

Examples 25 to 28 and Comparative Examples 14 to 17

In these Examples and Comparative Examples, each of the powdery processing aids for polyolefin resins was blended with an ethylene-vinyl acetate copolymer (Evaflex V5274, manufactured by Dupont-Mitsui Polychemicals Co., Ltd.) used as polyolefin resin B, with a proportion shown in Table 4, respectively, and the resulting mixture was melt-kneaded in the same manner as in Example 11 to obtain pellets. The evaluation results of the pellets thus obtained are shown in Table 4.

TABLE 3

|  |  |  | Ex. 21 | Ex. 22 | Ex. 23 | Ex. 24 | Comp. Ex. 10 | Comp. Ex. 11 | Comp. Ex. 12 | Comp. Ex. 13 |
|---|---|---|---|---|---|---|---|---|---|---|
| Blending composition [part] | PE |  | 100 | 100 | 100 | 100 | 100 | 100 | 100 | 100 |
|  | Powdery processing aid | A1 | 10 | — | — | — | — | — | — | — |
|  |  | A2 | — | 10 | — | — | — | — | — | — |
|  |  | A8 | — | — | 10 | — | — | — | — | — |
|  |  | A9 | — | — | — | 10 | — | — | — | — |
|  |  | A11 | — | — | — | — | — | 10 | — | — |
|  |  | A12 | — | — | — | — | — | — | 10 | — |
|  |  | A14 | — | — | — | — | — | — | — | 10 |
| Evaluation results | Melt tension [N] |  | 0.037 | 0.034 | 0.035 | 0.023 | 0.022 | 0.022 | 0.022 | 0.034 |
|  | Melt viscosity [Pa·s] |  | 666 | 650 | 652 | 485 | 565 | 362 | 399 | 388 |

The abbreviation in the table is as follows.
PE: polyethylene

TABLE 4

|  |  | Ex. 25 | Ex. 26 | Ex. 27 | Ex. 28 | Comp. Ex. 14 | Comp. Ex. 15 | Comp. Ex. 16 | Comp. Ex. 17 |
|---|---|---|---|---|---|---|---|---|---|
| Blending composition [part] | EVA | 100 | 100 | 100 | 100 | 100 | 100 | 100 | 100 |
|  | Powdery processing aid A1 | 10 | — | — | — | — | — | — | — |
|  | A2 | — | 10 | — | — | — | — | — | — |
|  | A8 | — | — | 10 | — | — | — | — | — |
|  | A9 | — | — | — | 10 | — | — | — | — |
|  | A11 | — | — | — | — | — | 10 | — | — |
|  | A12 | — | — | — | — | — | — | 10 | — |
|  | A14 | — | — | — | — | — | — | — | 10 |
| Evaluation results | Melt tension [N] | 0.055 | 0.041 | 0.053 | 0.033 | 0.024 | 0.020 | 0.023 | 0.035 |
|  | Melt viscosity [Pa·s] | 473 | 455 | 486 | 380 | 416 | 311 | 461 | 293 |

The abbreviation in the table is as follows.
EVA: ethylene-vinyl acetate copolymer Examples 29 to 32 and Comparative Examples 18 to 21

In these Examples and Comparative Examples, each of the powdery processing aids for polyolefin resins was blended with polypropylene (Novatec FY4, manufactured by Japan Polypropylene Corporation) used as polyolefin resin B and with a hydrogenated styrene elastomer (Tuftec H1062, manufactured by Asahi Kasei Chemicals Corporation) used as thermoplastic elastomer C, with a proportion shown in Table 5, respectively, and the resulting mixture was melt-kneaded in the same manner as in Example 11 to obtain pellets. The evaluation results of the pellets thus obtained are shown in Table 5.

TABLE 5

|  |  | Ex. 29 | Ex. 30 | Ex. 31 | Ex. 32 | Comp. Ex. 18 | Comp. Ex. 19 | Comp. Ex. 20 | Comp. Ex. 21 |
|---|---|---|---|---|---|---|---|---|---|
| Blending composition [part] | PP | 80 | 80 | 80 | 80 | 80 | 80 | 80 | 80 |
|  | Hydrogenated SEBS | 20 | 20 | 20 | 20 | 20 | 20 | 20 | 20 |
|  | Powdery processing aid A1 | 10 | — | — | — | — | — | — | — |
|  | A2 | — | 10 | — | — | — | — | — | — |
|  | A8 | — | — | 10 | — | — | — | — | — |
|  | A9 | — | — | — | 10 | — | — | — | — |
|  | A11 | — | — | — | — | — | 10 | — | — |
|  | A12 | — | — | — | — | — | — | 10 | — |
|  | A14 | — | — | — | — | — | — | — | 10 |
| Evaluation results | Melt tension [N] | 0.064 | 0.055 | 0.060 | 0.032 | 0.023 | 0.020 | 0.022 | 0.036 |
|  | Melt viscosity [Pa·s] | 360 | 346 | 352 | 305 | 270 | 198 | 297 | 301 |

The abbreviations in the table are as follows.
PP: polypropylene
Hydrogenated SEBS: hydrogenated styrene elastomer Examples 33 to 36 and Comparative Examples 22 to 25

In these Examples and Comparative Examples, each of the powdery processing aids for polyolefin resins was blended with Milastomer 6030N (manufactured by Mitsui Chemicals, Inc.) used as a mixture of polyolefin resin B and thermoplastic elastomer C, with a proportion shown in Table 6, respectively, and the resulting mixture was melt-kneaded in the same manner as in Example 11 to obtain pellets. The evaluation results of the pellets thus obtained are shown in Table 6.

Note that, in Comparative Example 24 where powdery processing aid (A12) containing methyl methacrylate polymer having a mass average molecular weight of 3,000,000 was used, compatibility of powdery processing aid (A12) with Milastomer 6030N was low and hence a strand could not be drawn out.

TABLE 6

|  |  | Ex. 33 | Ex. 34 | Ex. 35 | Ex. 36 | Comp. Ex. 22 | Comp. Ex. 23 | Comp. Ex. 24 | Comp. Ex. 25 |
|---|---|---|---|---|---|---|---|---|---|
| Blending composition [part] | TPO | 100 | 100 | 100 | 100 | 100 | 100 | 100 | 100 |
|  | Powdery processing aid A1 | 10 | — | — | — | — | — | — | — |
|  | A2 | — | 10 | — | — | — | — | — | — |
|  | A8 | — | — | 10 | — | — | — | — | — |
|  | A9 | — | — | — | 10 | — | — | — | — |

TABLE 6-continued

|  |  | Ex. 33 | Ex. 34 | Ex. 35 | Ex. 36 | Comp. Ex. 22 | Comp. Ex. 23 | Comp. Ex. 24 | Comp. Ex. 25 |
|---|---|---|---|---|---|---|---|---|---|
|  | A11 | — | — | — | — | — | 10 | — | — |
|  | A12 | — | — | — | — | — | — | 10 | — |
|  | A14 | — | — | — | — | — | — | — | 10 |
| Evaluation results | Melt tension [N] | 0.034 | 0.032 | 0.031 | 0.020 | 0.017 | 0.011 | Not measurable | 0.023 |
|  | Melt viscosity [Pa · s] | 284 | 276 | 247 | 221 | 212 | 135 | Not measurable | 220 |

The abbreviation in the table is as follows.
TPO: Milastomer 6030N (a mixture of polyolefin resin B and thermoplastic elastomer C)

Examples 37 to 39 and Comparative Examples 26 and 27

In these Examples and Comparative Examples, each of the powdery processing aids for polyolefin resins was blended with an ethylene-vinyl acetate copolymer (Evaflex V5274, manufactured by Dupont-Mitsui Polychemicals Co., Ltd.) used as polyolefin resin B and with magnesium hydroxide (Magseeds W—H5, manufactured by Konoshima Chemical Co. Ltd.) used as the filler, with a proportion shown in Table 7, respectively.

Subsequently, the resulting mixture was melt-kneaded with a co-rotating twin screw extruder (manufactured by Research Laboratory of Plastics Technology Co., Ltd.) at a barrel temperature of 180° C. and a number of screw revolutions of 150 rpm to obtain pellets of a polyolefin resin composition. The evaluation results of the pellets thus obtained are shown in Table 7.

TABLE 7

|  |  | Ex. 37 | Ex. 38 | Ex. 39 | Comp. Ex. 26 | Comp. Ex. 27 |
|---|---|---|---|---|---|---|
| Blending composition [part] | EVA | 100 | 100 | 100 | 100 | 100 |
|  | Mg(OH)$_2$ | 150 | 150 | 150 | 150 | 150 |
|  | Powdery processing aid A1 | 5 | — | — | — | — |
|  | A4 | — | 5 | — | — | — |
|  | A8 | — | — | 5 | — | — |
|  | A12 | — | — | — | — | 5 |
| Evaluation results | Appearance | a | b | a | c | b |

The abbreviation in the table is as follows.
EVA: ethylene-vinyl acetate copolymer It is obvious from Table 1 that the powdery processing aids in Examples 1 to 10 and Comparative Examples 1 to 3 had good handling properties as a powder. By contrast, the powdery processing aid in Comparative Example 4 had bad handling properties as a powder. The powdery processing aids in Examples 1 to 10 and Comparative Examples 1 to 3 can be homogeneously kneaded with polyolefin resins because they are easily mixed with the polyolefin resins as matrix resins when hand-blended and are stably supplied by a feeder.

It is obvious from Table 2 that remarkable improvements in melt tension were observed in Examples 11 to 20 where powdery processing aids (A1) to (A10) were added, respectively, as compared with Comparative Example 5 where the powdery processing aid was not added. In particular, when melt tension of the resulting polypropylene composition is 0.055 (N) or more, excellent effects can be given in shaping of the polypropylene such as profile extrusion and foam molding.

Whereas, in Comparative Example 6, the molecular weight of the powdery processing aid is outside the range of the present invention and hence improvement effect on melt tension is low. In Comparative Example 7, the composition of the powdery processing aid is outside the range of the present invention and hence compatibility with the polypropylene is low, so that break of the strand was generated at the time of extrusion. Therefore, measurements of melt tension and melt viscosity were abandoned.

It is obvious from Table 3 that remarkable improvements in melt tension were observed in Examples 21 to 24 where the powdery processing aids of the present invention were added, respectively, as compared with Comparative Example 10 where the powdery processing aid was not added.

Whereas, in Comparative Example 11, the molecular weight of the powdery processing aid is outside the range of the present invention and hence improvement effect on melt tension was not observed. In Comparative Example 12, the composition of the powdery processing aid is outside the range of the present invention and hence compatibility with the polyethylene is low, so that improvement effect on melt tension was not observed.

It is obvious from Table 4 that remarkable improvements in melt tension were observed in Examples 25 to 28 where the powdery processing aids of the present invention were added, respectively, as compared with Comparative Example 14 where the powdery processing aid was not added.

Whereas, in Comparative Example 15, the molecular weight of the powdery processing aid is outside the range of the present invention and hence improvement effect on melt tension was not observed. In Comparative Example 16, the composition of the powdery processing aid is outside the range of the present invention and hence compatibility with the ethylene-vinyl acetate copolymer is low, so that improvement effect on melt tension was not observed.

It is obvious from Table 5 that remarkable improvements in melt tension were observed in Examples 29 to 32 where the powdery processing aids of the present invention were added, respectively, as compared with Comparative Example 18 where the powdery processing aid was not added.

Whereas, in Comparative Example 19, the molecular weight of the powdery processing aid is outside the range of the present invention and hence improvement effect on melt tension was not observed. In Comparative Example 20, the composition of the powdery processing aid is outside the range of the present invention and hence compatibility with the polypropylene is low, so that improvement effect on melt tension was not observed It is obvious from Table 6 that remarkable improvements in melt tension were observed in Examples 33 to 36 where the powdery processing aids of the present invention were added, respectively, as compared with Comparative Example 22 where the powdery processing aid was not added.

Whereas, in Comparative Example 23, the molecular weight of the powdery processing aid is outside the range of the present invention and hence improvement effect on melt tension was not observed. In Comparative Example 24, the composition of the powdery processing aid is outside the range of the present invention and hence compatibility with Milastomer 6030N is low, so that break of the strand was generated at the time of extrusion. Therefore, measurements of melt tension and melt viscosity were abandoned.

It is obvious from Table 7 that improvement in the surface appearance of the strand was observed in Examples 37 to 39 where the powdery processing aids of the present invention were added, respectively, as compared with Comparative Example 26 where the powdery processing aid was not added.

Whereas, in Comparative Example 27, the composition of the powdery processing aid is outside the range of the present invention and hence compatibility with the ethylene-vinyl acetate copolymer is low, so that improvement effect on the surface appearance of the strand was low.

INDUSTRIAL APPLICABILITY

Powdery processing aid A for polyolefin resins of the present invention has good handling properties as a powder and good dispersibility in polyolefin resins, and is able to improve shaping processability of polyolefin resins.

A polyolefin resin composition excellent in drawing properties during calendaring, thermoforming properties, blow molding properties, foam molding properties, and the like can be provided by blending powdery processing aid A for polyolefin resins of the present invention with polyolefin resin B.

The polyolefin resin composition of the present invention can improve the surface state of the resulting extrusion-molded products such as sheets and films and have good extrusion processability. In addition, the polyolefin resin composition in which a filler is mixed can realize improved surface appearance and excellent stiffness of sheets or films obtained by calendaring or extrusion molding.

When powdery processing aid A for polyolefin resins of the present invention is used in the case of recycling of polyolefin resins, lowering of melt tension at the time of shaping can be prevented and shaping processabilities such as drawing properties during calendaring, thermoforming properties, blow molding properties, and foam molding properties can be favorably maintained. In addition, powdery processing aid A has remarkably good dispersibility in polyolefin resins, and hence can give excellent surface appearance of the resulting recycled products.

What is claimed is:

1. Powdery processing aid A for polyolefin resins, comprising a polymer having a mass average molecular weight of 150,000 to 20,000,000 and
   which has isobutyl methacrylate units as a main chain component.

2. A polyolefin resin composition comprising the powdery processing aid A for polyolefin resins according to claim 1 and polyolefin resin B.

3. A polyolefin resin composition comprising the powdery processing aid A for polyolefin resins according to claim 1, polyolefin resin B, and thermoplastic elastomer C.

4. A shaped article obtained by shaping the polyolefin resin composition according to claim 2 or 3.

5. A method for producing the powdery processing aid A for polyolefin resins according to claim 1, comprising recovering the polymer from a latex of the polymer which has a mass average particle diameter of 50 to 250 nm.

6. A shaped article obtained by shaping the polyolefin resin composition according to claim 3.

7. The powdery processing aid A according to claim 1, wherein the isobutyl methacrylate units are present in an amount of at least 50% by mass of the polymer.

8. The powdery processing aid A according to claim 1, wherein the isobutyl methacrylate units are present in an amount of at least 70% by mass of the polymer.

9. The powdery processing aid A according to claim 1, wherein the mass average molecular weight of 500,000 to 20,000,000.

10. The powdery processing aid A according to claim 1, wherein the mass average molecular weight of 1,000,000 to 20,000,000.

11. The powdery processing aid A according to claim 1, wherein the mass average molecular weight of 1,600,000 to 20,000,000.

12. The powdery processing aid A according to claim 1, wherein the mass average molecular weight of 150,000 to 5,000,000.

13. The powdery processing aid A according to claim 1, wherein the mass average molecular weight of 150,000 to 7,000,000.

14. The polyolefin resin composition according to claim 2, wherein powdery processing aid A is present in an amount of 0.5 to 20 parts by mass based on 100 parts by mass of polyolefin resin B.

15. The polyolefin resin composition according to claim 2, wherein powdery processing aid A is present in an amount of 1 to 15 parts by mass based on 100 parts by mass of polyolefin resin B.

16. The polyolefin resin composition according to claim 3, wherein powdery processing aid A is present in an amount of 0.5 to 20 parts by mass based on 100 parts by mass of the sum of polyolefin resin B and thermoplastic elastomer C.

17. The polyolefin resin composition according to claim 3, wherein powdery processing aid A is present in an amount of 1 to 15 parts by mass based on 100 parts by mass of the sum of polyolefin resin B and thermoplastic elastomer C.

18. The polyolefin resin composition according to claim 3, wherein polyolefin resin B is present in an amount of from 25 to less than 100% by mass and thermoplastic elastomer C is present in an amount of from more than 0 to 75% by mass, wherein the sum of polyolefin resin B and thermoplastic elastomer C is 100% by mass.

* * * * *